(12) United States Patent
Horiike

(10) Patent No.: US 9,165,534 B2
(45) Date of Patent: Oct. 20, 2015

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Yoshiteru Horiike, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 324 days.

(21) Appl. No.: 13/903,341

(22) Filed: May 28, 2013

(65) Prior Publication Data
US 2013/0321474 A1  Dec. 5, 2013

(30) Foreign Application Priority Data
May 31, 2012 (JP) .................................. 2012-124831

(51) Int. Cl.
G09G 5/00  (2006.01)
G09G 5/34  (2006.01)
G06F 3/0488  (2013.01)
G06F 3/0485  (2013.01)

(52) U.S. Cl.
CPC ................ *G09G 5/34* (2013.01); *G06F 3/0485* (2013.01); *G06F 3/0488* (2013.01); *G09G 5/346* (2013.01); *G09G 2354/00* (2013.01); *G09G 2370/24* (2013.01)

(58) Field of Classification Search
CPC ..................................................... G06F 3/0485
USPC .......................................... 715/860; 345/684
See application file for complete search history.

(56) References Cited

U.S. PATENT DOCUMENTS

| | | | | |
|---|---|---|---|---|
| 8,370,764 | B2 * | 2/2013 | Jarrett et al. ................... | 715/784 |
| 2003/0210255 | A1 * | 11/2003 | Hiraki ............................ | 345/684 |
| 2013/0152012 | A1 * | 6/2013 | Jarrett et al. ................... | 715/784 |

FOREIGN PATENT DOCUMENTS

JP  2010-152777 A  7/2010

* cited by examiner

*Primary Examiner* — William Titcomb
(74) *Attorney, Agent, or Firm* — Canon USA, Inc. IP Division

(57) ABSTRACT

An information processing apparatus for improving operability when a content is scroll-displayed by an operation for scrolling such as a flick operation. The information processing apparatus displays a plurality of contents in a predetermined display area, and scroll-displays the contents according to an instruction to perform the scroll display. When a press of a button displayed outside the display area has been detected, processing corresponding to the pressed button is performed if the scroll display is not being performed, and is not performed if the scroll display is being performed.

14 Claims, 9 Drawing Sheets

INFORMATION PROCESSING APPARATUS, METHOD FOR CONTROLLING INFORMATION PROCESSING APPARATUS, AND STORAGE MEDIUM

BACKGROUND OF THE INVENTION

1. Field of the Invention

The present invention relates to an information processing apparatus, a method for controlling the information processing apparatus, and a storage medium.

2. Description of the Related Art

In recent years, a computer including a touch panel has generally been used. When such a computer is used, any contents are displayed as a list on a screen, and a flick operation is performed on the list, to scroll the list (see Japanese Patent Application Laid-Open No. 2010-152777).

The flick operation for scrolling the displayed list of contents is an intuitively comprehensible operation for a user. On the other hand, when the list is desired to be scrolled in a large amount, the flick operation needs to be repeated many times. Therefore, the number of touches becomes larger than that in an operation using a scroll bar. There may occur a situation where a user erroneously touches a button outside the list, so that the screen shifts to another screen corresponding to the button. Such a situation more easily occurs when the user quickly touches the button for the flick operation many times and repeatedly vigorously performs the flick operation many times.

SUMMARY OF THE INVENTION

The present invention is directed to an image processing apparatus capable of improving operability when a content is scroll-displayed by an operation for scrolling and a method for controlling the information processing apparatus.

According to an aspect of the present invention, an information processing apparatus includes a display unit configured to display a plurality of contents in its predetermined display area, an instruction unit configured to issue an instruction to scroll-display the plurality of contents displayed in the display area, and a detection unit configured to detect a press of a button displayed outside the display area, in which when the detection unit has detected the press of the button displayed outside the display area, processing corresponding to the pressed button is performed if the scroll display based on the instruction by the instruction unit is not being performed and processing corresponding to the pressed button is not performed if the scroll display based on the instruction by the instruction unit is being performed.

According to another aspect of the present invention, an information processing apparatus includes a display unit configured to display a plurality of contents in its predetermined display area, an instruction unit configured to issue an instruction to scroll-display the plurality of contents displayed in the display area, and a display control unit configured to perform control to scroll-display the plurality of contents while enlarging and displaying the display area in response to an instruction to perform the scroll display by the instruction unit, in which the display control unit performs control to display the enlarged and displayed display area by returning the display area to its size before the enlargement in response to the end of the scroll display.

Further features of the present invention will become apparent from the following description of exemplary embodiments with reference to the attached drawings.

DESCRIPTION OF THE EMBODIMENTS

Hardware Configuration

Figure 1:
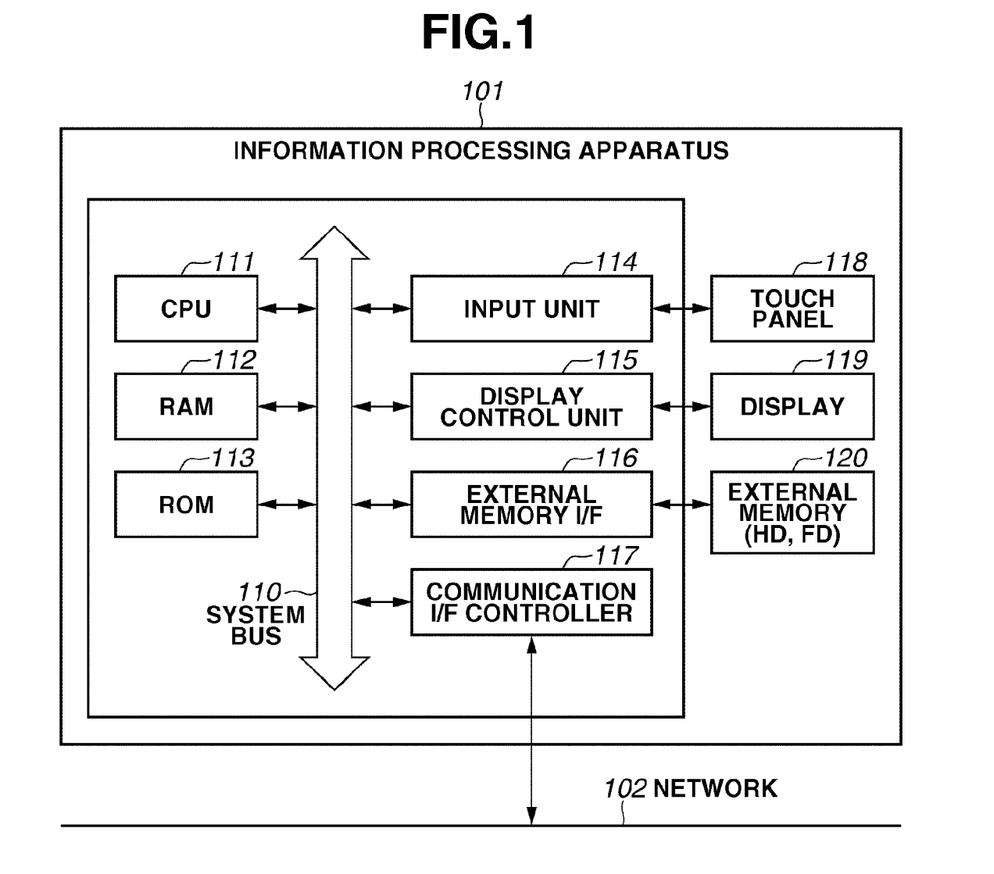
FIG. 1 illustrates a hardware configuration of an information processing apparatus according to an exemplary embodiment of the present invention.

FIG. 1 illustrates a hardware configuration of an information processing apparatus 101 according to each of exemplary embodiments of the present invention.

In FIG. 1, a central processing unit (CPU) 111, a random access memory (RAM) 112, a read-only memory (ROM) 113, an input unit 114, a display control unit 115, an external memory interface (I/F) 116, and a communication I/F controller 117 are connected to a system bus 110. A touch panel 118, a display 119, and an external memory 120 are connected to the system bus 110. Units connected to the system bus 110 can exchange data with one another via the system bus 110.

The ROM 113 is a nonvolatile memory, and stores image data and other data, and various programs for operating the CPU 111, respectively, in its predetermined areas. The RAM 112 is a volatile memory, and is used as a main memory or a temporary storage area such as a work area of the CPU 111. The CPU 111 controls each of the units in the information processing apparatus 101 using the RAM 112 as a work memory according to the program stored in the ROM 113, for example. The program for operating the CPU 101 is not necessarily stored in the ROM 113, and may be previously stored in the external memory (a hard disk, a solid state drive (SSD), etc.) 120.

The input unit 114 receives a user operation, generates a control signal corresponding to the user operation, and supplies the generated control signal to the CPU 111. For example, the input unit 114 includes a character information input device (not illustrated) such as a keyboard and a pointing device such as a mouse (not illustrated) or the touch panel 118 as an input device for receiving a user operation. The touch panel 118 is an input device configured in such a manner that coordinate information corresponding to a touched position of the input unit 114 formed in a planar shape, for example, is output. The CPU 111 controls each of the units in the information processing apparatus 101 according to the program based on a control signal generated and supplied by the input unit 114 according to the user operation performed to the input device. Thus, the information processing apparatus 101 is caused to perform an operation according to the user operation.

The display control unit 115 outputs a display signal for displaying an image to the display 119 serving as a display unit. For example, a display control signal generated by the CPU 111 according to the program is supplied to the display control unit 115. The display control unit 115 generates a display signal based on the display control signal, and outputs the generated display signal to the display 119. For example, the display control unit 115 displays a graphical user interface (GUI) screen constituting a GUI on the display 119 based on the display control signal generated by the CPU 111.

The touch panel 118 is integrated with the display 119. For example, the touch panel 118 has its light transmittance not preventing display on the display 119, and is attached to an upper layer of a display surface of the display 119. The input coordinates in the touch panel 118 and the display coordinates on the display 119 are associated with each other. Thus, the GUI can be configured as if a user could directly operate a screen displayed on the display 119.

The external memory 120 such as a hard disk, a floppy (registered trademark) disk, a compact disk (CD), a digital versatile disk (DVD), or a memory card, for example, can be mounted on the external memory I/F 116. Data is read and written out of and into the mounted external memory 120 based on the control by the CPU 111. The communication I/F controller 117 communicates with a local area network (LAN), the Internet, various types of wired or wireless networks 102, for example, based on the control by the CPU 111.

The CPU 111 can detect operations and states, described below, for example, on the touch panel 118; an operation to touch the touch panel 118 with a finger or a pen (hereinafter referred to as "touch"), a state where the touch panel 118 is touched with a finger or a pen (hereinafter referred to as "touch-on"), a state where a finger or a pen is moving while the touch panel 118 is touched therewith (hereinafter referred to as "move"), an operation to release a finger or a pen with which the touch panel 118 has been touched (hereinafter referred to as "touch-up"), and a state where the touch panel 118 is touched with nothing (hereinafter referred to as "touch-off"). The operations, the states, and position coordinates at which the touch panel 118 is touched with a finger or a pen are notified to the CPU 111 via the system bus 110, and the CPU 111 determines what operation has been performed on the touch panel 118 based on the notified information. For "move", a movement direction of the finger or the pen that moves on the touch panel 118 can be determined for each vertical component/horizontal component on the touch panel 118 based on a change in the position coordinates. When "touch-up" is performed via predetermined "move" after "touch" on the touch panel 118, a stroke is drawn. An operation to quickly draw the stroke is referred to as "flick". "Flick" is an operation to quickly move the finger by a certain distance while the touch panel 118 is touched therewith and released from the finger, i.e., an operation to quickly trace the touch panel 118 to flick the touch panel 118. The CPU 111 can determine, when "move" over a predetermined distance or more at a predetermined speed or more has been detected, and "touch-up" has been directly detected, that "flick" has been performed. The CPU 111 determines, when "move" over a predetermined distance or more has been detected, and "touch-on" has been directly detected, that a drag has been performed. The touch panel 118 may use any one of touch panels of various types such as a resistance film type, an electrostatic capacitance type, a surface acoustic wave type, an infrared ray type, an electromagnetic induction type, an image recognition type, and an optical sensor type.

Figure 2:
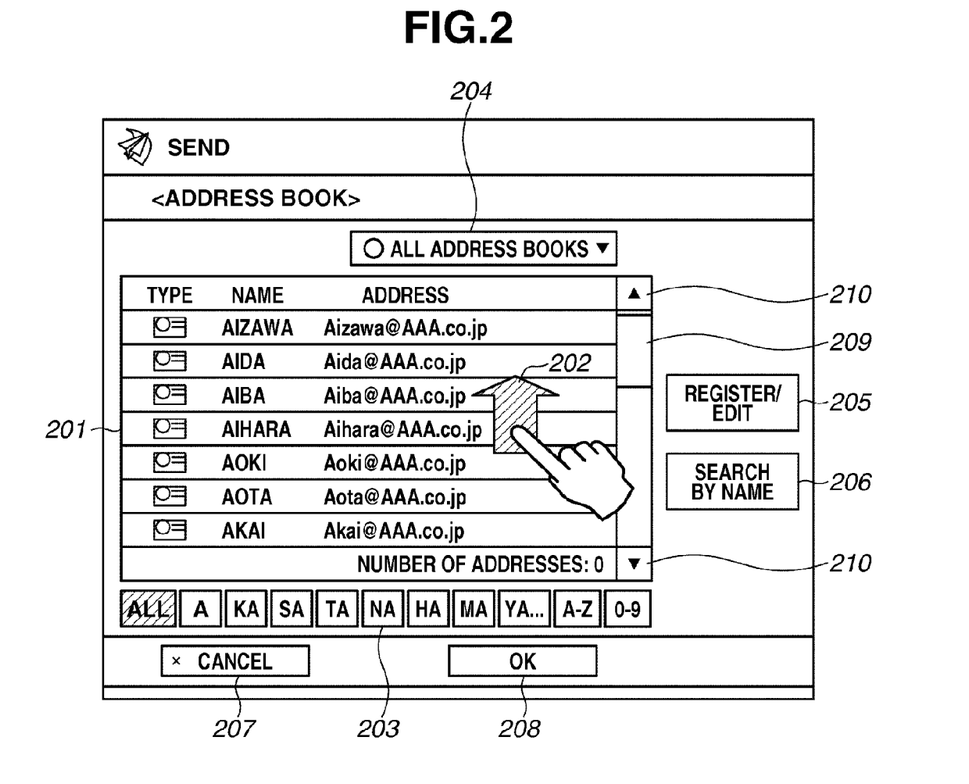
FIG. 2 illustrates an example of a screen displayed on a display of the information processing apparatus according to an exemplary embodiment of the present invention.

FIG. 2 illustrates a display on the display 119 in the information processing apparatus 101 according to a first exemplary embodiment of the present invention. An example of the display on the display 119 according to the first exemplary embodiment of the present invention will be described below with reference to FIG. 2.

FIG. 2 illustrates a screen for selecting an address serving as a destination of data transmission when a data transmission function of the information processing apparatus 101 is used. Data of an address book is stored in the external memory 120 in the information processing apparatus 101. An example of the data transmission function is an e-mail transmission. In the case of the e-mail transmission, a mail address is used as address data. In this case, the address book includes a plurality of mail addresses and name information respectively corresponding to the mail addresses.

In FIG. 2, a list of a plurality of address data registered in the address book is displayed in an area 201. If the number of address data included in the address book is large, as illustrated in FIG. 2, a list of address data is not accommodated in one screen of the display 119. Therefore, a user needs to scroll the displayed list of address data to display the desired address on the address data display area 201. An arrow 202 indicates an example in which a user performs a flick operation of a portion within the address data display area 201 upward from below. When the user performs the flick operation upward from below, the list of address data displayed in the address data display area 201 is scrolled upward. The speed of the scroll is proportional to the strength of the flick operation. The strength of the flick operation is derived from pressure during "touch-on" (or during "move") and a movement speed of the finger during "touch-up". Thus, the data display area 201 is a specific area where the scroll display is performed by a user operation. In the following description, the data display area 201 may also be referred to as a scroll area.

As another method for allowing the user to display the desired address data in the address data display area 201 if the number of address data included in the address book is large, a button group 203 can also be used. The button group 203 includes buttons for respectively designating "kana characters", "numeric characters", and "alphabetical characters" each representing an initial character of a name registered in the address data. If the button "A" in the button group 203 is pressed, for example, address data in which names beginning with "A" are respectively registered are displayed as a list in the address data display area 201.

A button 204 is a button for selecting the type of address book to be displayed in the address data display area 201. When the button 204 is pressed, a pull-down menu for selecting the type of address book to be displayed is displayed, and the address book to be displayed can be selected. The type of address book means a distinction among an address book generated for each user, an address book retained in the information processing apparatus 101, and an address book retained in a server on a network. Alternatively, the type of address book includes an address book in which addresses corresponding to each of the types of data transmission (e-mail transmission, file transmission by a file transport protocol (FTP), transmission by a server message block (SMB)

and a distributed authoring and versioning protocol for the WWW (WebDAV), and facsimile (FAX) transmission) are registered.

A button 205 is a button for displaying a registration screen for registering new address data or an editing screen for performing an editing operation with respect to address data selected from the address data display area 201. A button 206 is a button for displaying a search screen for searching from the address data included in the address book for the address data desired by the user using the name of the address data as a condition. A cancel button 207 is a button for issuing an instruction to cancel results of all operations performed on the display screen illustrated in FIG. 2 and to return to a screen previously displayed. An OK button 208 is a button for issuing an instruction to finalize the operation performed on the display screen illustrated in FIG. 2 and to proceed to the subsequent screen (or a screen previously displayed). In the present exemplary embodiment, the various types of buttons are provided as soft keys to be pressed when touched by the user.

A method for an operation to scroll the address data display area 201 on the screen illustrated in FIG. 2 includes several methods in addition to the above-mentioned flick operation. In the present exemplary embodiment, there are three operation methods, described below, other than the flick operation. However, the operation method for scrolling the address data display area 201 is not limited to a total of four methods including the flick operation. The first operation method other than the flick operation is a method for allowing the user to drag any portion within the address data display area 201. In this method, a list of addresses is scrolled by an amount of movement (a movement distance) from a portion which the user has touched to "touch-up". The second operation method is a scroll using a scroll bar 209. More specifically, an operation to touch a display portion of the scroll bar 209 on the display screen illustrated in FIG. 2 and drag the display portion in "touch-on" is performed. In this method, the list of addresses is scrolled according to an amount of movement of the scroll bar 209. The third operation method is a method for pressing the scroll button 210. More specifically, an operation to touch a display portion of the scroll button (an upward or downward arrow key) 210 on the display screen illustrated in FIG. 2 and maintain "touch-on" is performed. In this method, the list of addresses is scrolled according to a period of time during which "touch-on" is maintained on the scroll button 210.

Figure 3:
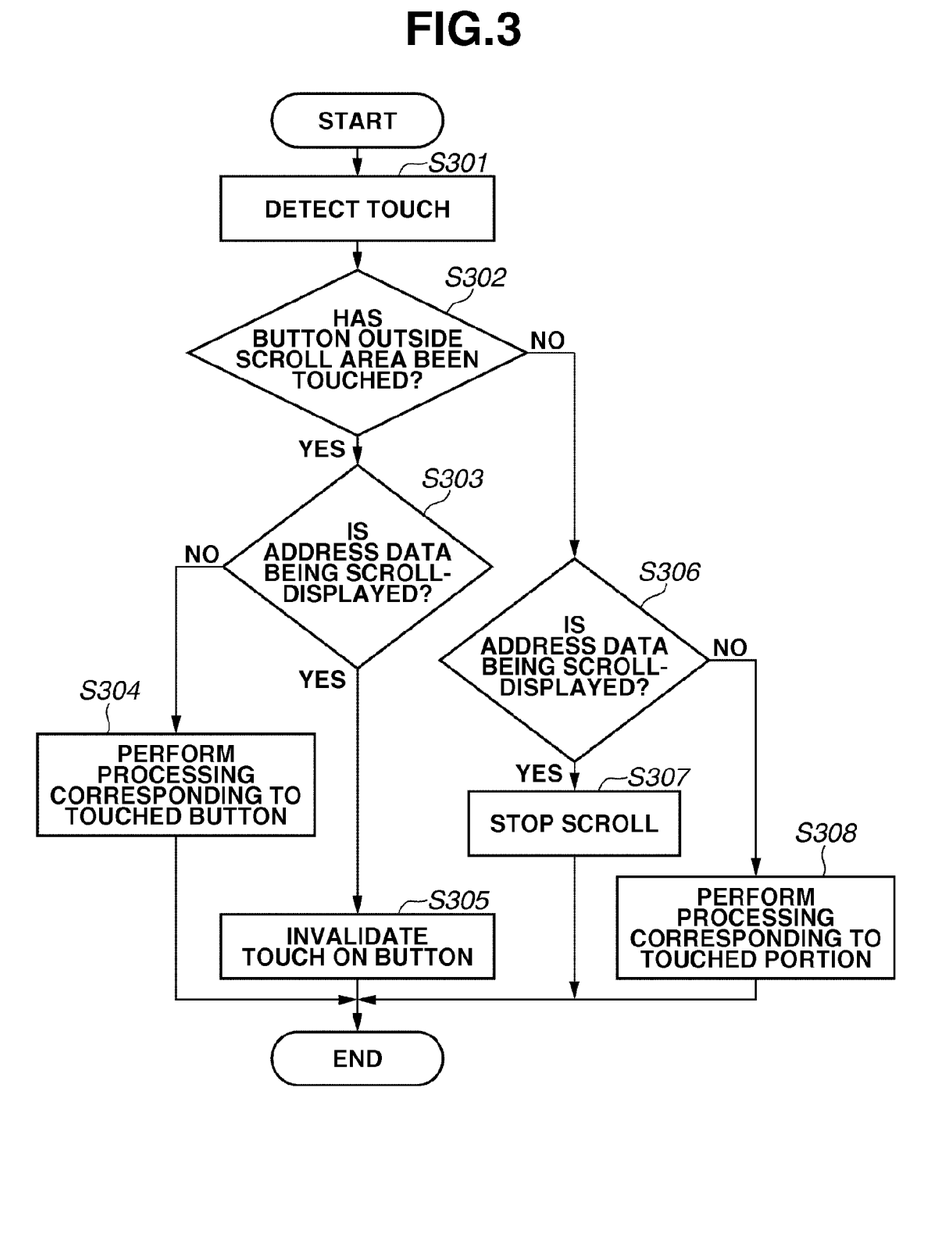
FIG. 3 is a flowchart illustrating an operation of an information processing apparatus according to a first exemplary embodiment.

An operation of the information processing apparatus 101 according to the present exemplary embodiment will be described below with reference to FIG. 3. FIG. 3 is a flowchart performed when the screen illustrated in FIG. 2 is displayed on the display 119 in the information processing apparatus 101 according to the present exemplary embodiment. Each of steps illustrated in FIG. 3 is processed when the CPU 111 executes a program stored in the ROM 113 or the external memory 120.

In step S301, the CPU 111 detects a touch on the display screen. When the touch has been detected, the processing proceeds to step S302. In step S302, the CPU 111 determines whether a portion where the touch has been detected is a button outside the scroll area 201. If it is determined that the button outside the scroll area 201 has been touched (YES in step S302), the processing proceeds to step S303. In step S303, the CPU 111 determines whether address data displayed in the scroll area 201 is currently being scroll-displayed. A state where the scroll display is being performed indicates that each of the address data in the list is displayed while moving in a certain direction caused by an operation such as the above-mentioned flick operation for scrolling the address data.

If it is determined that the address data is being scroll-displayed (YES in step S303), the processing proceeds to step S305. In step S305, the CPU 111 invalidates a touch on the button outside the scroll area 201. To "invalidate" indicates that the CPU 111 does not perform processing corresponding to the touched button.

On the other hand, if it is not determined that the address data is being scroll-displayed (NO in step S303), the processing proceeds to step S304. In step S304, the CPU 111 performs processing corresponding to the touched button. If the registration/editing button 205 illustrated in FIG. 2 is touched, for example, control is performed to display a registration/editing screen in place of the screen illustrated in FIG. 2 on the display 119.

If it is determined that the portion where the touch has been detected is not the button outside the scroll area 201 (NO in step S302), the processing proceeds to step S306. The case where the portion where the touch has been detected is not the button outside the scroll area 201 includes a case where the inside of the scroll area 201 has been touched and a case where the scroll bar 209 or the scroll button 210 has been touched. In step S306, the CPU 111 determines whether the address data displayed in the scroll area 201 is currently being scroll-displayed, like in step S303. If it is determined that the address data is being scroll-displayed (YES in step S306), the processing proceeds to step S307. In step S307, the CPU 111 stops a scroll currently during the scroll display. More specifically, if the inside of the scroll area 201 or either one of the scroll bar 209 and the scroll button 210 has been touched while the list of address data displayed in the scroll area 201 is being scroll-displayed, the scroll is stopped. On the other hand, if it is determined that the address data is not being scroll-displayed (NO in step S306), the processing proceeds to step S308. In step S308, the CPU 111 performs processing corresponding to the touched portion. More specifically, if any one of the address data in the list of address data displayed in the scroll area 201 has been touched, the touched address data is set to be in a selected state. If the scroll bar 209 or the scroll bar 210 has been touched, scroll processing of the address data displayed in the scroll area 201 is started.

As described above, in the information processing apparatus according to the present exemplary embodiment, when the user scroll-displays the list of address data using the flick operation or the like, the touch on the button outside the scroll area 201 is invalidated while the scroll display is being performed. If the user has unintentionally touched the button outside the scroll area 201 during the scroll display, therefore, processing for the button is not started so that convenience for the user who intends to perform the scroll is improved.

Particularly if an attempt to move the list having a significantly large data amount (the number of records constituting the list) from its uppermost part to its lowermost part is made, for example, the user may continuously perform the flick operation. More specifically, the user may continuously repeat the flick operation many times even during the scroll display without waiting until the scroll is stopped by performing the flick operation once. At this time, the user may easily perform the flick operation on the inside of the scroll area 201 from a state where the outside of the scroll area 201 has been touched regardless of the intension to perform the scroll. Alternatively, the user may easily perform the flick operation on the outside of the scroll area 201 from a state where the inside of the scroll area 201 has been touched. In such a situation, the present exemplary embodiment is significantly effective when the user who intends to perform the scroll unintentionally presses the button outside the scroll area 201.

In the present exemplary embodiment, the touches on all the buttons outside the scroll area 201 during the scroll display have been invalidated in the processing in step S305. However, the touch on the button may be validated even during the scroll display depending on the type of the button. For example, the touches on only the OK button 208 and the cancel button 207 on the screen illustrated in FIG. 2 may also be validated during the scroll display. Thus, the touch on only the specific button may also be validated even during the scroll display depending on the type of the button, i.e., a content of processing corresponding to the button. The specific button may be selectable optionally by the user. More specifically, a user (or a manager) may be able to set whether each of the buttons illustrated in FIG. 2 is to be validated or invalidated during the scroll display.

A second exemplary embodiment will be described below. In the first exemplary embodiment, the touches on the buttons outside the scroll area 201 are uniformly invalidated (or are invalidated depending on the type of each of the buttons) during the scroll display. On the other hand, in the second exemplary embodiment, control is performed to not uniformly invalidate touches on buttons outside the scroll area 201 but invalidate only touches on buttons arranged in the vicinity of the scroll area 201. The hardware configuration of the information processing apparatus 101 illustrated in FIG. 1 and the screen illustrated in FIG. 2 are similar in the first and the second exemplary embodiments, and hence a difference from the first exemplary embodiment will be described in detail below.

Figure 4:
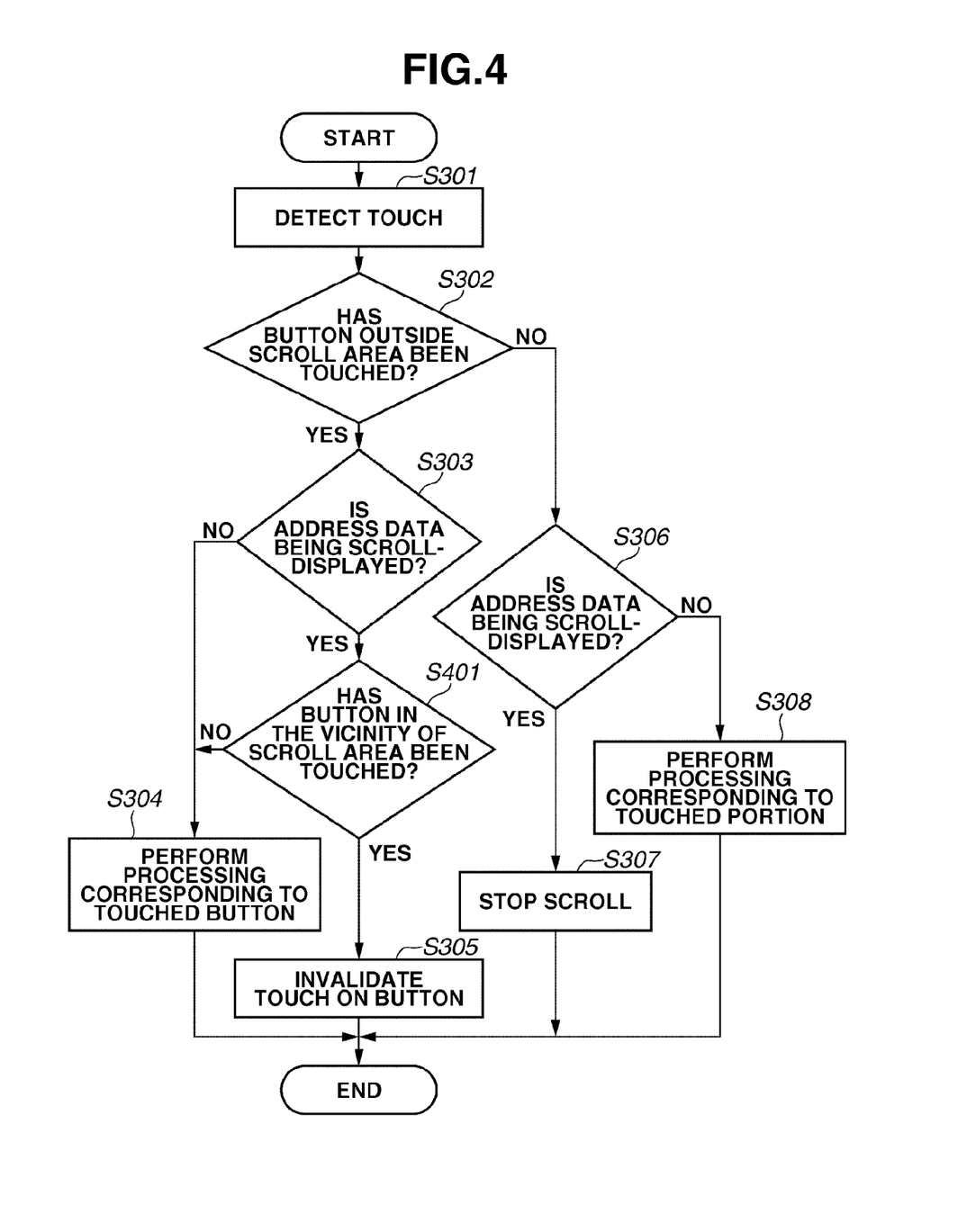
FIG. 4 is a flowchart illustrating an operation of an information processing apparatus according to a second exemplary embodiment.

FIG. 4 is a flowchart illustrating an operation of the information processing apparatus 101 according to the present exemplary embodiment. Each of steps illustrated in FIG. 4 is performed when a CPU 111 executes a program stored in a ROM 113 or an external memory 120. The steps similar to those in the flowchart illustrated in FIG. 3 in the first exemplary embodiment are assigned the same step numbers. Processing different from that in the flowchart illustrated in FIG. 3 will be described below.

If a touch on a button outside the scroll area 201 has been detected (YES in step S302), and if it is determined that a scroll display is currently being performed (YES in step S303), the processing proceeds to step S401.

In step S401, the CPU 111 determines whether the button, the touch of which has been detected, is in the vicinity of the scroll area 201. More specifically, information indicating buttons arranged in the vicinity of the scroll area 201 is registered in a memory provided in the information processing apparatus 101, and the registered information is referred to, to determine whether the touched button is in the vicinity of the scroll area 201. Alternatively, the determination may be made by assigning each of buttons (buttons 203 to 208 in the example illustrated in FIG. 2) displayed on each of screens including the scroll area 201 information indicating whether its display position is in the vicinity of the scroll area 201 and referring to the information. In the example illustrated in FIG. 2, the buttons 203, 204, 205, and 206 are arranged in the vicinity of the scroll area 201, and the buttons 207 and 208 are not arranged in the vicinity of the scroll area 201, for example.

If it is determined that the touched button is arranged in the vicinity of the scroll area 201 (YES in step S401), the processing proceeds to step S305. In step S305, the CPU 111 invalidates the touch on the button. On the other hand, if it is not determined that the touched button is arranged in the vicinity of the scroll area 201 (NO in step S401), the processing proceeds to step S304. In step S304, the CPU 111 performs processing corresponding to the button. In the example illustrated in FIG. 2, if any one of the buttons 203, 204, 205, and 206 has been touched during the scroll display, its touching operation is invalidated, and processing corresponding to the button is not performed. On the other hand, the touch on each of the buttons 207 and 208 is not invalidated even during the scroll display, and processing corresponding to the button is performed.

As described above, in the present exemplary embodiment, the touches on the buttons outside the scroll area 201 during the scroll display are not uniformly invalidated but only the touch on the button arranged in the vicinity of the scroll area 201 is invalidated. The user possibly may intentionally touch the button in a place spaced apart from the scroll area 201 even during the scroll display. On the other hand, the user may possibly touch the button in the vicinity of the scroll area 201 during the scroll display erroneously (unintentionally) in a process of a scroll operation. According to the present exemplary embodiment, control can be performed in consideration of such a situation further than that in the first exemplary embodiment.

A third exemplary embodiment will be described below. In the first exemplary embodiment, the touches on the buttons outside the scroll area 201 are uniformly invalidated (or are invalidated depending on the type of each of the buttons) during the scroll display. On the other hand, in the third exemplary embodiment, a button to be invalidated is changed depending on whether a current scroll direction during a scroll display is a vertical direction (an upward and downward direction) or a horizontal direction (a rightward and leftward direction).

A hardware configuration of an information processing apparatus 101 illustrated in FIG. 1 and a screen illustrated in FIG. 2 are common in the first and third exemplary embodiments, and hence a difference from the first exemplary embodiment will be described in detail below.

Figure 5:
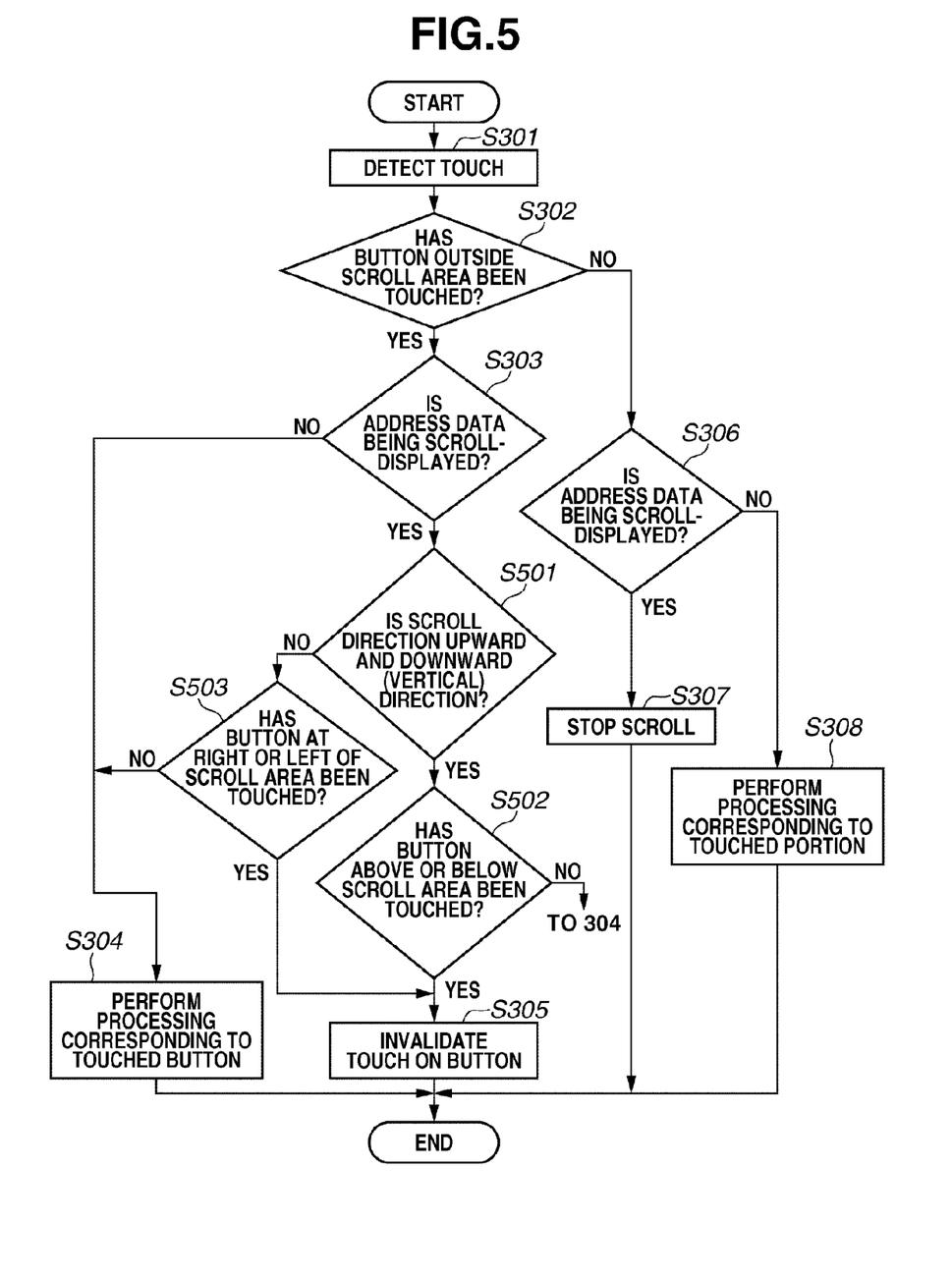
FIG. 5 is a flowchart illustrating an operation of an information processing apparatus according to a third exemplary embodiment.

FIG. 5 is a flowchart illustrating an operation of the information processing apparatus 101 according to the present exemplary embodiment. Each of steps illustrated in FIG. 5 is processed when a CPU 111 executes a program stored in a ROM 113 or an external memory 120. The steps similar to those in the flowchart illustrated in FIG. 3 in the first exemplary embodiment are assigned the same step numbers. Processing different from that in the flowchart illustrated in FIG. 3 will be described below.

If a touch on a button outside a scroll area 201 has been detected (YES in step S302), and if it is determined that a scroll display is currently being performed (YES in step S303), the processing proceeds to step S501.

In step S501, the CPU 111 determines whether the current scroll direction during the scroll display is the upward and downward direction. If a flick operation is performed upward from below, for example, as indicated by the symbol 202 illustrated in FIG. 2, the scroll direction is the upward and downward direction. If it is determined that the scroll direction is the upward and downward direction (YES in step S501), the processing proceeds to step S502. In step S502, the CPU 111 determines whether the touched button is arranged above or below the scroll area 201. More specifically, information representing the button arranged above or below the scroll area 201 is registered in a memory provided in the information processing apparatus 101, and the registered information is referred to, to determine whether the touched button is arranged above or below the scroll area 201. Alternatively, the determination may be made by assigning each of buttons (buttons 203 to 208 in the example illustrated in FIG. 2) displayed on each of screens including the scroll area 201 information indicating whether the button is arranged above or below the scroll area 201 or at the right or left of the scroll area 201, and referring to the information. In the example illustrated in FIG. 2, the buttons 203, 204, 207, and 208 are arranged above or below the scroll area 201, and the buttons 205 and 206 are arranged at the right or left of the scroll area 201.

If it is determined that the touched button is arranged above or below the scroll area 201 (YES in step S502), the processing proceeds to step S305. In step S305, the CPU 111 invalidates the touch on the button. On the other hand, if it is not determined that the touched button is arranged above or below the scroll area 201 (NO in step S502), the processing proceeds to step S304. In step S304, the CPU 111 performs processing corresponding to the button. In the example illustrated in FIG. 2, described above, if any one of the buttons 203, 204, 207, and 208 has been touched during the scroll display, its touching operation is invalidated, and processing corresponding to the button is not performed. On the other hand, the touch on each of the buttons 205 and 206 is not invalidated even during the scroll display, and processing corresponding to the button is performed.

If it is determined that the scroll direction is not the upward and downward direction (NO in step S501), the processing proceeds to step S503. A scroll direction other than the upward and downward direction is the rightward and leftward direction (horizontal direction). More specifically, the processing proceeds to step S503 when the scroll in the rightward and leftward direction has been performed. While the scroll in the rightward and leftward direction is not assumed in the example illustrated in FIG. 2, both the scroll in the upward and downward direction and the scroll in the rightward and leftward direction may be performed depending on a content of information displayed in the scroll area 201. In the example illustrated in FIG. 2, for example, there are a large number of display items in each of records of address data. The display items can be displayed by being horizontally scrolled. While the display items in each of the records include only "type", "name", and "address" in FIG. 2, there may be more specific information other than the display items.

In step S503, the CPU 111 determines whether the touched button is arranged at the right or left of the scroll area 201. More specifically, information representing the button at the right or left of the scroll area 201 is registered in a memory provided in the information processing apparatus 101, and the registered information is referred to, to determine whether the touched button is arranged at the right or left of the scroll area 201. Alternatively, information indicating whether each of the buttons is arranged above or below the scroll area 201 or at the right or left of the scroll area 201 may be associated with the button and managed, as described above. As described above, in the example illustrated in FIG. 2, the buttons 203, 204, 207, and 208 are arranged above or below the scroll area 201, and the buttons 205 and 206 are arranged at the right or left of the scroll area 201.

If it is determined that the touched button is arranged at the right or left of the scroll area 201 (YES in step S503), the processing proceeds to step S305. In step S305, the CPU 111 invalidates the touch on the button. On the other hand, if it is not determined that the touched button is arranged at the right or left of the scroll area 201 (NO in step S201), the processing proceeds to step S304. In step S304, the CPU 111 performs processing corresponding to the button. In the example illustrated in FIG. 2, described above, if either one of the buttons 205 and 206 is touched during the scroll display, its touching operation is invalidated, and processing corresponding to the button is not performed. On the other hand, if any one of the buttons 203, 204, 207, and 208 has been touched, the touch is not invalidated even during the scroll display, and processing corresponding to the button is performed.

As described above, in the present exemplary embodiment, the button to be invalidated is changed depending on whether the current scroll direction during the scroll display is the vertical direction (upward and downward direction) or the horizontal direction (rightward and downward direction). More specifically, only a touch on the button arranged in the upward and downward direction is invalidated during the scroll display in the upward and downward direction, and only a touch on the button arranged in the rightward and leftward direction is invalidated during the scroll display in the rightward and leftward direction. If a flick operation is continuously performed, for example, as an operation for scrolling, an operation to touch an upper part of the scroll area 201 and then flick the upper part downward or to touch a lower part of the scroll area 201 and then flick the lower part upward is performed many times when the scroll is performed in the vertical direction. At this time, the button arranged above or below the scroll area 201 may be erroneously (unintentionally) touched. In other words, the touch on the button arranged at the right or left of the scroll area 201 when the scroll is performed in the vertical direction may be intentional one performed by expecting processing corresponding to the button. According to the present exemplary embodiment, control can be performed in consideration of such a situation further than that in the first exemplary embodiment.

A fourth exemplary embodiment will be described below. In the fourth exemplary embodiment, a button to be invalidated is changed depending on whether a current scroll direction during a scroll display is an upward direction or a downward direction.

A hardware configuration of an information processing apparatus 101 illustrated in FIG. 1 and a screen illustrated in FIG. 2 are common in the first and second exemplary embodiments, and hence a difference from the first exemplary embodiment will be described in detail below.

Figure 6:
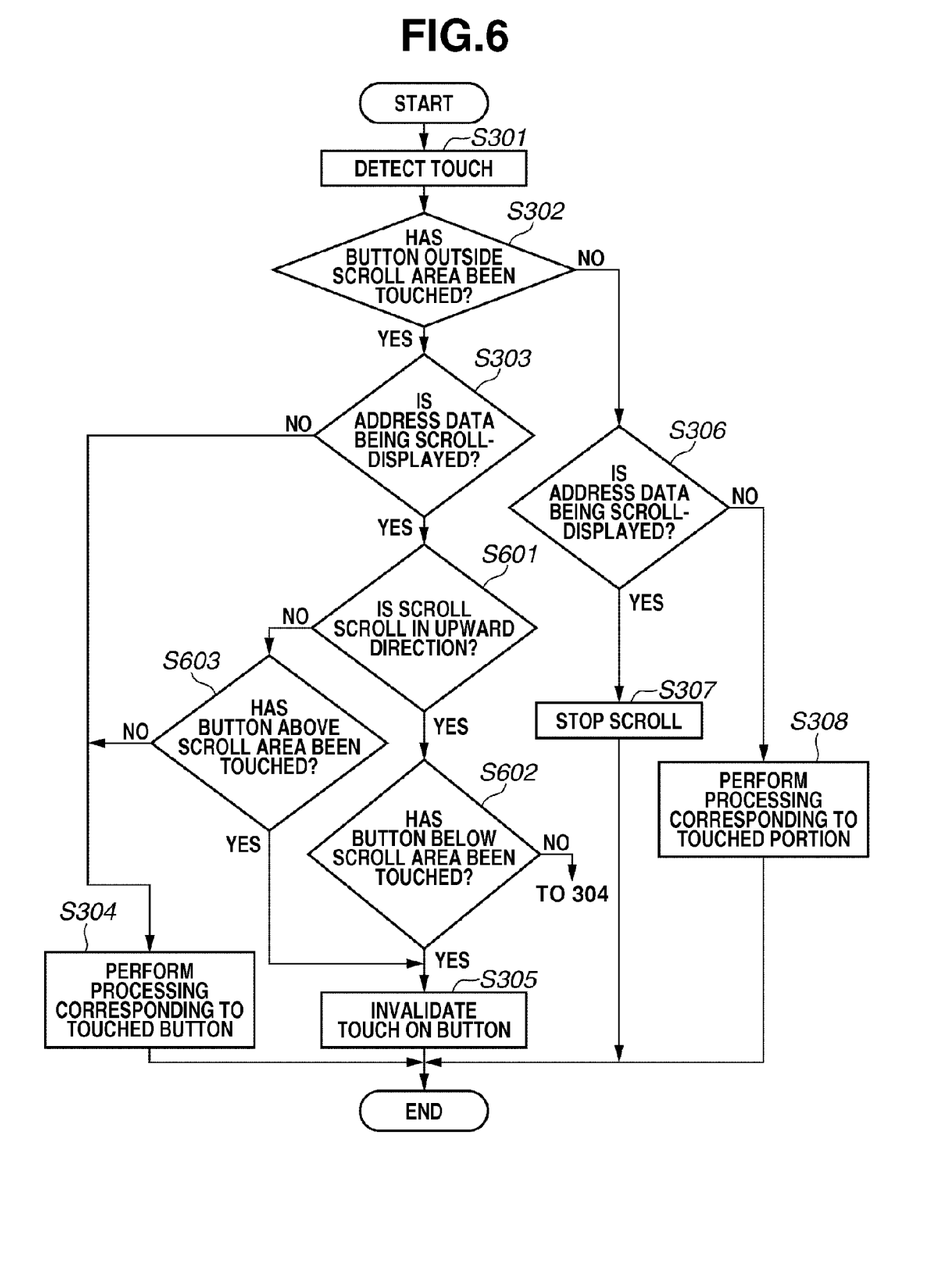
FIG. 6 is a flowchart illustrating an operation of an information processing apparatus according to a fourth exemplary embodiment.

FIG. 6 is a flowchart illustrating an operation of the information processing apparatus 101 according to the present exemplary embodiment. Each of steps illustrated in FIG. 6 is processed when a CPU 111 executes a program stored in a ROM 113 or an external memory 120. The steps similar to those in the flowchart illustrated in FIG. 3 in the first exemplary embodiment are assigned the same step numbers. Processing different from that in the flowchart illustrated in FIG. 3 will be described below.

If a touch on a button outside a scroll area 201 has been detected (YES in step S302), and if it is determined that a scroll display is currently being performed (YES in step S303), the processing proceeds to step S601.

In step S601, the CPU 111 determines whether a current scroll during the scroll display is a scroll performed upward from below (an upward scroll). If it is determined that the scroll is the upward scroll (YES in step S601), the processing proceeds to step S602. In step S602, the CPU 111 determines whether the touched button is arranged below the scroll area 201. More specifically, information representing the button arranged below the scroll area 201 is registered in a memory provided in the information processing apparatus 101, and the registered information is referred to, to determine whether the touched button is arranged below the scroll area 201. Alternatively, the determination may be made by assigning each of buttons (buttons 203 to 208 in the example illustrated in FIG. 2) displayed on each of screens including the scroll area 201 information indicating in which of areas above and below and at the right and left of the scroll area 201 the button is arranged, and referring to the information. In the example illustrated in FIG. 2, the buttons 203, 207, and 208 are arranged below the scroll area 201, the button 204 is arranged above the scroll area 201, and the buttons 205 and 206 are arranged at the right of the scroll area 201.

If it is determined that the touched button is arranged below the scroll area 201 (YES in step S602), the processing proceeds to step S305. In step S305, the CPU 111 invalidates the touch on the button. On the other hand, if it is not determined that the touched button is arranged below the scroll area 201 (NO in step S602), the processing proceeds to step S304. In step S304, the CPU 111 performs processing corresponding to the button. In the example illustrated in FIG. 2, described above, if any one of the buttons 203, 207, and 208 has been touched during the scroll display, its touching operation is invalidated, and processing corresponding to the button is not performed. On the other hand, the touch on each of the buttons 204, 205, and 206 is not invalidated even during the scroll display, and processing corresponding to the button is performed.

If it is determined that the scroll is not the upward scroll (NO in step S601), the processing proceeds to step S603. Scrolls other than the upward scroll include a downward scroll. In the example of the flowchart, a list displayed in the scroll area 201 can be scrolled only in an upward and downward direction (vertical direction), and cannot be scrolled in a rightward and leftward direction (horizontal direction).

More specifically, the processing proceeds to step S603 when the downward scroll has been performed. In step S603, the CPU 111 determines whether the touched button is arranged above the scroll area 201. More specifically, information representing the button above the scroll area 201 is registered in a memory provided in the information processing apparatus 101, and the registered information is referred to, to determine whether the touched button is above the scroll area 201. Alternatively, the determination may be made by assigning each of the buttons displayed on each of screens including the scroll area 201 (the buttons 203 to 208 in the example illustrated in FIG. 2) information indicating in which of areas above and below and at the right and left of the scroll area 201 the button is arranged and referring to the information. As described above, in the example illustrated in FIG. 2, the buttons 203, 207, and 208 are arranged below the scroll area 201, the button 204 is arranged above the scroll area 201, and the buttons 205 and 206 are arranged at the right of the scroll area 201.

If it is determined that the touched button is arranged above the scroll area 201 (YES in step S603), the processing proceeds to step S305. In step S305, the CPU 111 invalidates the touch on the button. On the other hand, if it is not determined that the touched button is arranged above the scroll area 201 (NO in step S603), the processing proceeds to step S304. In step S304, the CPU 111 performs processing corresponding to the button. In the example illustrated in FIG. 2, described above, if the button 204 has been touched during the scroll display, its touching operation is invalidated, and processing corresponding to the button is not performed. On the other hand, if any one of the buttons 203, 205, 206, 207, and 208 has been touched, the touch is not invalidated even during the scroll display, and processing corresponding to the button is performed.

As described above, in the present exemplary embodiment, the touches on the buttons outside the scroll area 201 are not uniformly invalidated, and the button to be invalidated is changed depending on whether the current scroll direction during the scroll display is the upward direction or the downward direction. More specifically, only a touch on the button arranged below the scroll area 201 is invalidated during the scroll display in the upward direction, and only a touch on the button arranged above the scroll area 201 is invalidated during the scroll display in the downward direction. If a flick operation is continuously performed, for example, as an operation for scrolling, an operation to touch a lower part of the scroll area 201 and then flick the lower part upward is performed many times when the upward scroll is performed. At this time, the button arranged below the scroll area 201 may possibly be erroneously (unintentionally) touched. In other words, a touch on the button arranged in an area other than the area below the scroll area 201 in the upward scroll may possibly be intentional one performed by expecting processing corresponding to the button. According to the present exemplary embodiment, control can be performed in consideration of such a situation further than that in the first exemplary embodiment.

While an example in which only the scroll in the upward and downward direction can be performed and the scroll in the rightward and leftward direction cannot be performed in the flowchart illustrated in FIG. 6 has been described, similar processing can also be performed for an example in which the scroll in the rightward and leftward direction can be performed. More specifically, only the button arranged at the left of the scroll area 201 may be invalidated during a scroll display in a rightward direction, and only the button arranged at the right of the scroll area 201 may be invalidated during a scroll display in a leftward direction.

A fifth exemplary embodiment will be described below. In the fifth exemplary embodiment, touches on buttons outside a scroll area 201 are not uniformly invalidated during a scroll display but validation and invalidation of the touch on each of the buttons outside the scroll area 201 are switched depending on a selected state of a record (content) in a list that is being scroll-displayed.

A hardware configuration of an information processing apparatus 101 illustrated in FIG. 1 and a screen illustrated in FIG. 2 are common in the first and fifth exemplary embodiments, and hence a difference from the first exemplary embodiment will be described in detail below.

Figure 7:
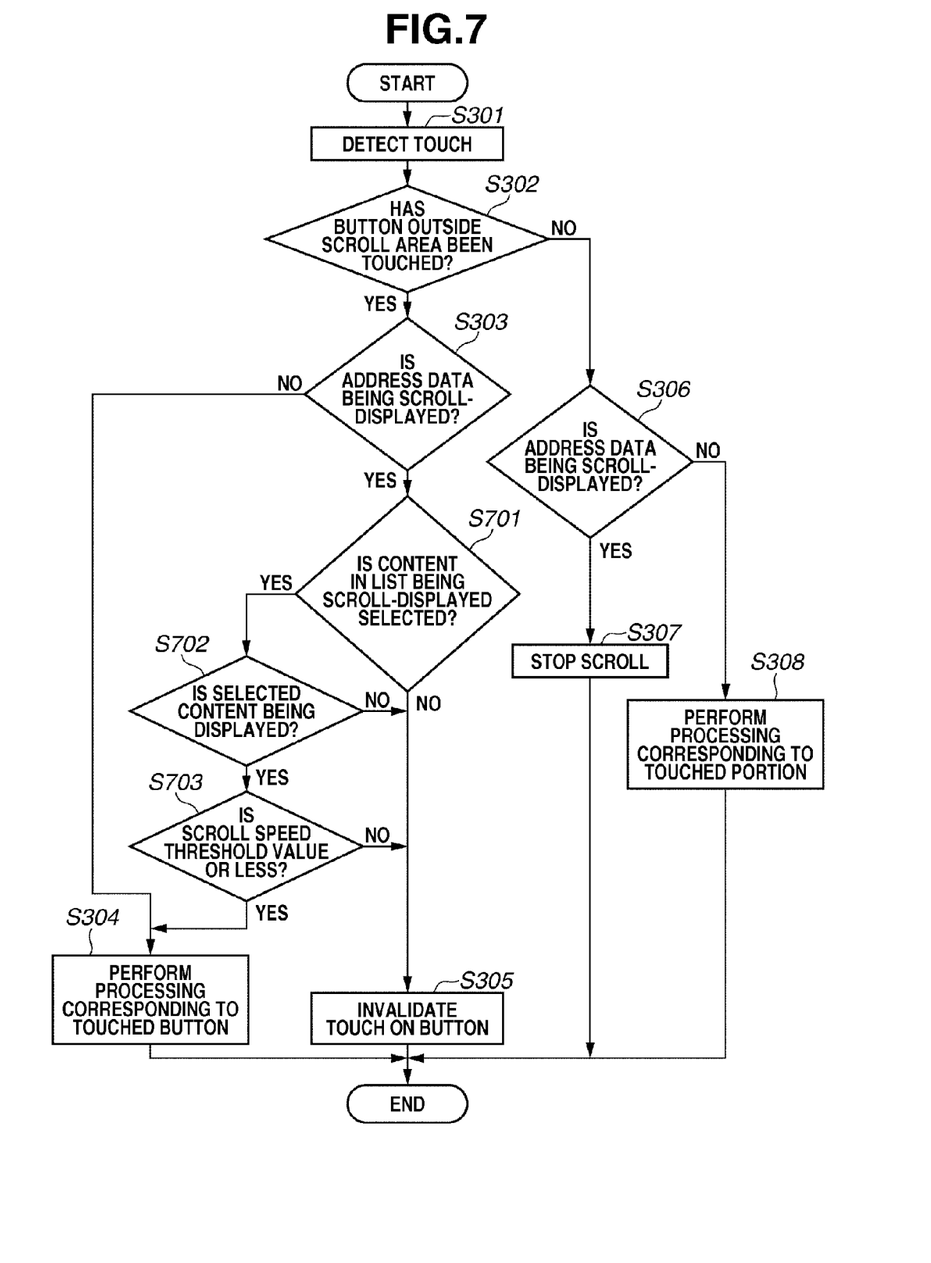
FIG. 7 is a flowchart illustrating an operation of an information processing apparatus according to a fifth exemplary embodiment.

FIG. 7 is a flowchart illustrating an operation of the information processing apparatus 101 according to the present exemplary embodiment. Each of steps illustrated in FIG. 7 is processed when a CPU 111 executes a program stored in a ROM 113 or an external memory 120. The steps similar to those in the flowchart illustrated in FIG. 3 in the first exemplary embodiment are assigned the same step numbers. Processing different from that in the flowchart illustrated in FIG. 3 will be described below.

If a touch on a button outside the scroll area 201 has been detected (YES in step S302), and if it is determined that a scroll display is currently being performed (YES in step S303), the processing proceeds to step S701.

In step S701, the CPU 111 determines whether any one of records (contents) in the list currently being scroll-displayed is selected. In the example illustrated in FIG. 2, the list during the scroll display is a list of address data. In this case, it is determined whether any one of the address data is selected.

If the content in the list is selected (YES in step S701), the processing proceeds to step S702. In step S702, the CPU 111 determines whether the selected one of the contents in the list is currently being displayed. More specifically, the CPU 111 determines whether the selected one of the contents in the list is currently being displayed in the scroll area 201. If it is determined that the selected content is being displayed (YES in step S702), the processing proceeds to step S703. In step S703, the CPU 111 determines whether the speed of a scroll to be currently performed is a predetermined threshold value or less. More specifically, it is determined which of a scroll at a low speed and a scroll at a high speed is being performed. A threshold value serving as a criteria for determination which of a scroll at a low speed and a scroll at a high speed is being performed is previously determined, and is retained in a memory in the information processing apparatus 101. If it is determined that the speed of the scroll to be currently performed is the predetermined threshold value or less (YES in step S703), the processing proceeds to step S304. In step S304, the CPU 111 determines that the touch on the button outside the scroll area 201 is valid, to perform processing corresponding to the button. On the other hand, if any one of the respective determinations does not satisfy the condition (NO in step S701, S702, or S703), the processing proceeds to step S305. In step S305, the CPU 111 invalidates the press of the button outside the scroll area 201.

As described above, in the present exemplary embodiment, the touches on the buttons outside the scroll area 201 are not uniformly invalidated but validation and invalidation of the touch on each of the buttons outside the scroll area 201 are switched depending on the selected state of the records (contents) in the list being scrolled. More specifically, only when the content in the list being scrolled is selected, the content is currently being displayed, and the scroll speed is the threshold value or less, the touch on the button outside the scroll area 201 is validated. One reason why the determination and the control like in the present exemplary embodiment are performed is that the following situation is considered.

After the user selects the content in the list, a drag operation is performed under the intention to scroll the list. If the drag operation is performed, the list is displayed in a stopped state without being scrolled after a finger (or a pen) is released from the touch panel. However, a flick operation may be detected after the finger is released from the touch panel during the drag operation depending on detection accuracy of the touch panel and strength of a touch operation by the user. Therefore, a scroll unintended by the user may be performed. In such a case, when the touch on the button outside the scroll area 201 is invalidated, although the scroll display is being performed, convenience for the user is impaired. In the present exemplary embodiment, the touch on the button outside the scroll area 201 is validated under the idea that it is intended by the user only when the above-mentioned condition is satisfied in consideration of such a situation. According to the present exemplary embodiment, control can be performed in consideration of such a situation further than that in the first exemplary embodiment.

A sixth exemplary embodiment will be described below. In any one of the above-mentioned first to fifth exemplary embodiments, the touches on the buttons outside the scroll area 201 are invalidated during the scroll display according to various conditions. On the other hand, in the sixth exemplary embodiment, control is performed so that a button cannot be touched by not invalidating a touch on the button upon receiving the touch but enlarging and displaying a scroll area 201 only during a scroll display to conceal other buttons.

A hardware configuration of an information processing apparatus 101 illustrated in FIG. 1 and a screen illustrated in FIG. 2 are common in the first and sixth exemplary embodiments, and hence a difference from the first exemplary embodiment will be described in detail below.

Figure 8:
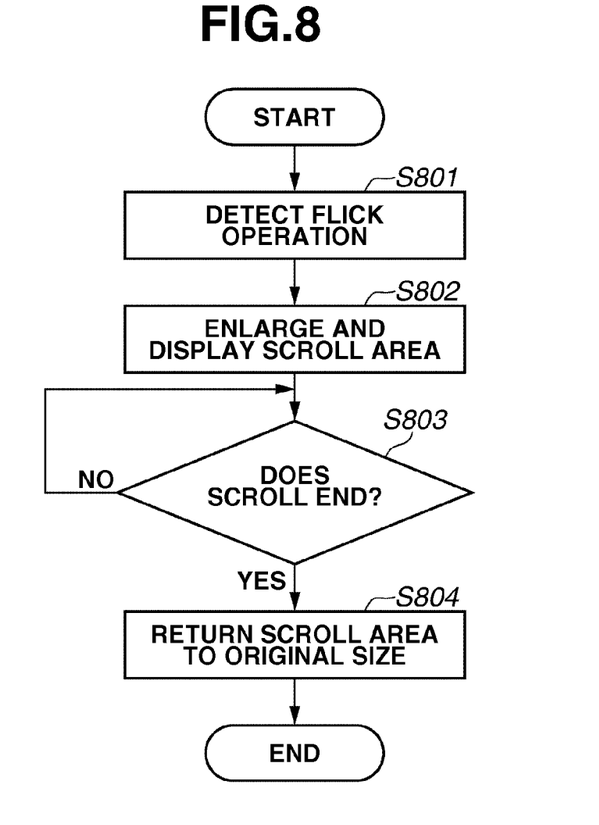
FIG. 8 is a flowchart illustrating an operation of an information processing apparatus according to a sixth exemplary embodiment.

FIG. 8 is a flowchart illustrating an operation of the information processing apparatus 101 according to the present exemplary embodiment. Each of steps illustrated in FIG. 8 is processed when a CPU 111 executes a program stored in a ROM 113 or an external memory 120.

Figure 9:
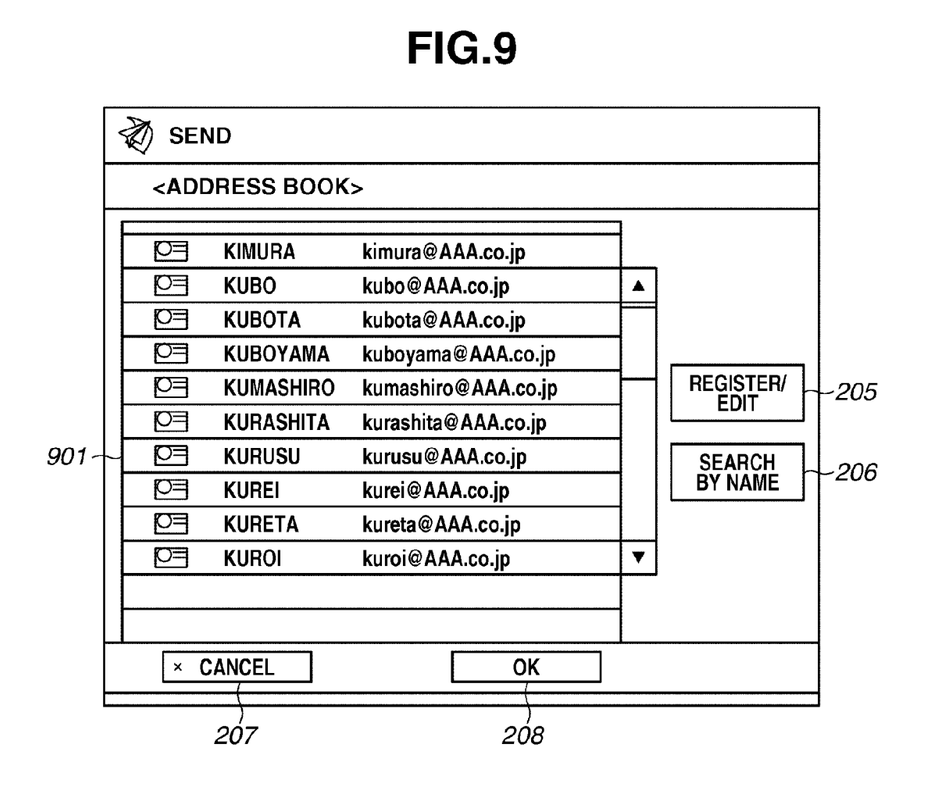
FIG. 9 illustrates an example of a screen displayed on a display of the information processing apparatus according to the sixth exemplary embodiment.

In step S801, the CPU 111 detects a flick operation performed by a user. This flick operation is performed within the scroll area 201. In step S802, the CPU 111 then scroll-displays a list of address data displayed in the scroll area 201. However, the scroll area 201 is enlarged and displayed in this case. FIG. 9 illustrates an example of a screen displayed on the display 119 in step S802. This example is an example of display while the scroll area 201 is being scroll-displayed by the flick operation on a screen of an address book illustrated in FIG. 2. As illustrated in FIG. 9, the scroll area 201 is enlarged into a scroll area 901 during the scroll display. Buttons 203 and 204 displayed in FIG. 2 are concealed by the enlargement and display. As a result, in the present exemplary embodiment, the buttons 203 and 204 cannot be touched during the scroll display. In the example illustrated in FIG. 9, buttons 205 to 208 are not concealed even by the scroll area 901 after the enlargement, and can be touched even during the scroll display. The touch on each of the buttons is not invalidated so that processing corresponding thereto is performed. In step S803, the CPU 111 determines whether the scroll ends. If the scroll ends (YES in step S803), the processing proceeds to step S804. In step S804, the CPU 111 returns the scroll area 901 after the enlargement and display in step S802 to the scroll area 201 of the original size, and displays the scroll area 201.

In the example illustrated in FIG. 9 in the present exemplary embodiment, while the buttons 205 to 208 are not concealed by the scroll area 901 after the enlargement, the scroll area 901 may be further enlarged and displayed to conceal the buttons 205 to 208. While timing at which the enlarged scroll area returns to the original size is the time when the scroll ends in the flowchart illustrated in FIG. 8, the enlarged scroll area may be desired to return to the original size during the scroll display. To respond to such a user request, a button for issuing an instruction to return a scroll area to the original size in synchronization with the enlargement and display of the scroll area under a scroll instruction may be displayed. If the user touches the button even during the scroll display, the scroll area 201 can be returned to the original size. This button disappears from a screen in response to the end of the scroll display.

As described above, according to the present exemplary embodiment, the scroll area is enlarged and displayed during the scroll display, and an area for performing a further flick operation for scrolling is also enlarged so that the operation becomes easy for the user. This is particularly effective in an apparatus including a display of small size and in a case where the scroll area is narrow. The button around the scroll area, which may be erroneously touched during the scroll display, is concealed by the enlargement and display of the scroll area. Therefore, the unintended button can be prevented from being touched. When the scroll ends, the enlarged scroll area returns to the original size. Therefore, the scroll area can be effectively enlarged and displayed only when required without being always assigned a large number of display areas. Further, the scroll area is enlarged according to a scroll instruction by a scroll operation. This is more effective because a dedicated instruction button for issuing an instruction to enlarge the scroll area need not be separately prepared, and the user need not separately press the button.

While the present invention has been described in detail above based on the exemplary embodiments, the present invention is not limited to these specific exemplary embodiments, and various forms are also included in the present invention without departing from the scope of the present invention. Alternatively, respective parts of the above-mentioned exemplary embodiments may be combined with each other, as needed. For example, the second exemplary embodiment and the third exemplary embodiment may be combined with each other, to invalidate the press of the button displayed above or below the scroll area 201 in the scroll in the upward and downward direction and arranged in the vicinity of the scroll area 201. Similarly, the second exemplary embodiment and the fourth exemplary embodiment may be combined with each other, or the third exemplary embodiment and the fourth exemplary embodiment may be combined with each other.

For example, a content to be scroll-displayed on a display is not limited to information about an address book serving as a list of address data. The content is limited to neither all information displayed in a list form nor the list form, and may be image data and a thumbnail display of the image data. Similar to the content displayed in the scroll area, a button displayed outside a scroll area is not limited to each of the buttons illustrated in the above-mentioned exemplary embodiments, similar to a content displayed in the scroll area. Any button is applicable.

The above-mentioned information processing apparatus 101 includes various types of apparatuses. The information processing apparatus 101 is not limited to a personal computer, a personal digital assistant (PDA), and a mobile phone terminal. The information processing apparatus 101 includes a printer, a scanner, a facsimile machine, a copying machine, a multi-function peripheral, a camera, a video camera, and other image viewers.

In the above-mentioned exemplary embodiments, not only the flick operation but also the drag operation and the operation using the scroll button have been described as the operation for scrolling. The present invention is also applicable in the case of a scroll display based on not only these operations but also other operations. However, in the flick operation out of the operations, the scroll is continued even after a user releases a finger (or a pen) from a touch panel. The present invention is further effective for such a scroll operation.

Characteristic steps in the flowchart described in each of the exemplary embodiments are examples of a determination unit, a second determination unit, a third determination unit, a fourth determination unit, a fifth determination unit, and a sixth determination unit in the present invention. Alternatively, characteristic steps are examples of a first display control step, a second display control step, and a third display control step. While an example in which one CPU 111 performs the flowcharts illustrated in FIGS. 3 to 8 has been described, a plurality of CPUs may perform the flowcharts in a distributed manner.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-124831 filed May 31, 2012, which is hereby incorporated by reference herein in its entirety.

What is claimed is:

1. An information processing apparatus comprising:
a display unit configured to display a plurality of contents in a predetermined display area thereof;
an instruction unit configured to issue an instruction to scroll-display the plurality of contents displayed in the display area; and
a detection unit configured to detect a press of a button displayed outside the display area,
wherein when the detection unit has detected the press of the button displayed outside the display area, processing corresponding to the pressed button is performed if the scroll display based on the instruction by the instruction unit is not being performed, and processing corresponding to the pressed button is not performed if the scroll display based on the instruction by the instruction unit is being performed.

2. The information processing apparatus according to claim 1, further comprising:
a touch panel configured to receive a touch operation by a user,
wherein the instruction unit issues the instruction to perform the scroll display based on a flick operation in the display area.

3. The information processing apparatus according to claim 1, wherein the content is address data included in an address book used to select an address for communication.

4. The information processing apparatus according to claim 1, further comprising
a determination unit configured to determine whether a display position of the button of which press has been detected by the detection unit is in the vicinity of the display area,
wherein when the detection unit has detected the press of the button displayed outside the display area, processing corresponding to the pressed button is performed if the determination unit determines that the display position of the pressed button is not in the vicinity of the display area even if the scroll display based on the instruction by the instruction unit is being performed.

5. The information processing apparatus according to claim 1, further comprising
a second determination unit configured to determine whether a display position of the button of which press has been detected by the detection unit is above or below the display area when a scroll based on the instruction by the instruction unit is a scroll in an upward and downward direction,
wherein when the detection unit has detected the press of the button displayed outside the display area, processing corresponding to the pressed button is performed if the second determination unit determines that a direction of the scroll is the upward and downward direction and a display position of the pressed button is neither above nor below the display area even if the scroll display based on the instruction by the instruction unit is being performed.

6. The information processing apparatus according to claim 1, further comprising:
a third determination unit configured to determine whether a display position of the button of which press has been detected by the detection unit is arranged at the right or left of the display area when a scroll based on the instruction by the instruction unit is a scroll in a rightward and leftward direction,
wherein when the detection unit has detected the press of the button displayed outside the display area, processing corresponding to the pressed button is performed if the third determination unit determines that a direction of the scroll is the rightward and leftward direction and a display position of the pressed button is neither at the right nor the left of the display area even if the scroll display based on the instruction by the instruction unit is being performed.

7. The information processing apparatus according to claim 1, further comprising:
a fourth determination unit configured to determine whether a display position of the button of which press has been detected by the detection unit is arranged below the display area when a scroll based on the instruction by the instruction unit is a scroll in an upward direction,
wherein when the detection unit detects the press of the button displayed outside the display area, processing corresponding to the pressed button is performed if the fourth determination unit determines that a direction of the scroll is the upward direction and a display position of the pressed button is not below the display area even if the scroll display based on the instruction by the instruction unit is being performed.

8. The information processing apparatus according to claim 1, further comprising:
a selection unit configured to select, out of the plurality of contents displayed by the display unit, a content,
a fifth determination unit configured to determine whether the content selected by the selection unit is being displayed in the display area when the detection unit has detected the press of the button, and
a sixth determination unit configured to determine whether a scroll speed of the scroll display based on the instruction by the instruction unit is a predetermined value or less, and
wherein when the detection unit has detected the press of the button displayed outside the display area, processing corresponding to the pressed button is performed if the content selected by the selection unit is being displayed and the scroll speed is the predetermined value or less as a result of the determinations by the fifth determination unit and the sixth determination unit even if the scroll display based on the instruction by the instruction unit is being performed.

9. An information processing apparatus comprising:
a display unit configured to display a plurality of contents in a predetermined display area of the display unit;
an instruction unit configured to issue an instruction to scroll-display the plurality of contents displayed in the display area; and
a display control unit configured to perform control to scroll-display the plurality of contents while enlarging and displaying the display area in response to the instruction to perform the scroll display by the instruction unit,
wherein the display control unit performs control to display the enlarged and displayed display area by returning the display area to a size before the enlargement in response to the end of the scroll display.

10. The information processing apparatus according to claim 9, wherein
the display unit displays a plurality of buttons that can be pressed by a user outside the predetermined display area, and
the display control unit enlarges and displays, when the display area is enlarged and displayed, the display area so that at least one of the plurality of buttons displayed by the display unit is concealed by the enlarged display area.

11. The information processing apparatus according to claim 10, wherein
the display control unit enlarges and displays, when the display area is enlarged and displayed, the display area so that at least the other one of the plurality of buttons displayed by the display unit is not concealed by the enlarged display area.

12. A method for controlling an information processing apparatus, comprising:
displaying a plurality of contents in a predetermined display area of a display unit;
issuing an instruction to scroll-display the plurality of contents displayed in the display area; and
detecting a press of a button displayed outside the display area,
wherein when the press of the button displayed outside the display area has been detected, processing corresponding to the pressed button is performed if the scroll display based on the instruction is not being performed, and processing corresponding to the pressed button is not performed if the scroll display based on the instruction is being performed.

13. A method for controlling an information processing apparatus, comprising:
displaying a plurality of contents in a predetermined display area of a display unit in a first display step;
issuing an instruction to scroll-display the plurality of contents displayed in the display area;
scroll-displaying the plurality of contents while enlarging and displaying the display area in response to the instruction to perform the scroll display; and
displaying the enlarged and displayed display area by returning the display area to a size before the enlargement in response to the end of the scroll display.

14. A storage medium storing a program for causing a computer to perform the method according to claim 12.

* * * * *